(12) United States Patent
Murphy et al.

(10) Patent No.: US 7,462,034 B1
(45) Date of Patent: Dec. 9, 2008

(54) BRAILLE DISPLAY ASSEMBLY

(75) Inventors: Patrick Murphy, Riverview, FL (US); Todd Conard, Ruskin, FL (US); Waldemar H Tunkis, Palm Harbor, FL (US); Michael Goldenberg, Melbourne Beach, FL (US); Carlos M Rodriguez, Palm Harbor, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 92 days.

(21) Appl. No.: 10/711,422

(22) Filed: Sep. 17, 2004

Related U.S. Application Data (60) Provisional application No. 60/481,979, filed on Jan. 30, 2004.

(51) Int. Cl.
*G09B 21/00* (2006.01)
(52) U.S. Cl. ..................................... 434/112
(58) Field of Classification Search ............... 434/112, 434/113, 115, 117; 400/109.1
See application file for complete search history.

(56) References Cited

U.S. PATENT DOCUMENTS

| | | | | |
|---|---|---|---|---|
| 4,836,784 A * | 6/1989 | Joachim | ..................... | 434/113 |
| 5,165,897 A * | 11/1992 | Johnson | ..................... | 434/113 |
| 5,226,817 A * | 7/1993 | Nakajima et al. | ........... | 434/113 |
| 5,449,292 A * | 9/1995 | Tani et al. | .................... | 434/114 |
| 5,685,720 A * | 11/1997 | Kashi | ......................... | 434/114 |
| 5,820,377 A * | 10/1998 | Murphy et al. | ............... | 434/113 |
| 5,842,867 A * | 12/1998 | Hong et al. | .................. | 434/114 |
| 6,109,922 A * | 8/2000 | Litschel et al. | .............. | 434/114 |
| 6,354,839 B1 * | 3/2002 | Schmidt et al. | .............. | 434/113 |
| 6,700,553 B2 * | 3/2004 | Becker et al. | .................. | 345/31 |
| 6,705,868 B1 * | 3/2004 | Schleppenbach et al. | ..... | 434/114 |
| 6,712,613 B2 * | 3/2004 | Depta | .......................... | 434/114 |
| 6,743,021 B2 * | 6/2004 | Prince et al. | ................. | 434/113 |
| 6,776,619 B1 * | 8/2004 | Roberts et al. | ............... | 434/113 |
| 7,083,416 B1 * | 8/2006 | Goldenbert | ................... | 434/113 |
| 2004/0091842 A1 * | 5/2004 | Carro | .......................... | 434/112 |
| 2004/0175677 A1 * | 9/2004 | Koch et al. | ................... | 434/113 |
| 2004/0197745 A1 * | 10/2004 | Hong et al. | ................... | 434/113 |
| 2005/0158695 A1 * | 7/2005 | Takahashi | .................... | 434/113 |

* cited by examiner

*Primary Examiner*—Kurt Fernstrom
(74) *Attorney, Agent, or Firm*—Holland & Knight LLP (57) ABSTRACT

The present invention discloses a Braille display assembly including a plurality of individual Braille cells positioned in a substantially rectangular housing having a backplane forming a portion of a top wall of the rectangular housing, the backplane adapted to receive a plurality of Braille cells, the rectangular housing selected to maintain each of the plurality of individual Braille cells in a predetermined position, independent of the positioning of the other cells. A plurality of sets of tactile pin holes are formed in the top wall of the rectangular housing, each tactile pin being adapted to slideably receive a tactile pin and a plurality of control buttons are positioned adjacent the top wall and in circuit communication with the backplane. A cell cap, providing a common tactile surface for the plurality of Braille cells, is included, the cell cap being releasably engaged to the top wall of the rectangular housing.

6 Claims, 9 Drawing Sheets

BRAILLE DISPLAY ASSEMBLY

CROSS REFERENCE TO RELATED APPLICATION

This application claims priority to Provisional Patent Application No. 60/481,979 filed, Jan. 30, 2004.

BACKGROUND OF INVENTION

A Braille display is an electromechanical device that connects to a computer by way of a serial or parallel cable. The display consists of a line of electromechanical tactile cells, each with six or eight pins that move up and down to represent the dots of a Braille cell. The display is used to represent a line of text on a computer screen. Each cell has six or eight tactile pins that are driven by electromechanical or piezoelectric effects. The user of the display is able to read a line of Braille cells by touching the pins of each cell as they are extended above a tactile surface. After a line has been read the user can refresh the display to allow for additional lines to be presented and read. Braille displays are often combined with other hardware and software to make up an integrated unit. For instance Braille displays are connected to video monitors to serve as the display unit, and many units incorporate speech output of the screen prompts.

Electromechanical tactile cells for use in refreshable Braille displays and graphical tactile displays are known in the art. An exemplary tactile cell as known in the art consists of eight piezoelectric reed elements corresponding to eight tactile pins. The necessary electrical connections and driving forces are provided to actuate the reeds, thereby causing the tactile pins to protrude above a tactile surface to allow the Braille character or graphic element to be displayed.

The design of the Braille cell display requires that many individual Braille cells be positioned adjacent to each other to form a tactile display for a line of text. The positioning of the Braille cells is critical to the effectiveness of the display. Due to the increased tactile sensitivity of the user, the placement of the tactile pins, and therefore the Braille cells, must be very precise. Many problems are caused by the dimensional tolerances of the individual Braille cells. Manufacturing the Braille cells with exact precision is not possible as variances in the dimensions arise.

Prior art Braille cell assemblies establish positioning of the cells reliant upon the contact of the individual Braille cells with the adjacent cells. According to previous Braille display assemblies as known in the art, the assembly is made by threading a plurality of Braille cells together on one or more rigid support rods. The rods are passed through holes in the frames of the Braille cells. With this construction methodology, the positioning of the Braille cells within the assembly is dependent upon the contact between the adjacent cells. As such, the individual deviations in the dimensional tolerances in each Braille cell will be manifested in the Braille display assembly. These deviations can result in a Braille display assembly with significant deviation from a desired dimensional specification. To alleviate some of the problems associated with this common method, the individual Braille cells are compressed together and the edges of the individual Braille cells are physically modified to meet a desired dimension, resulting in a very labor intensive solution. The positioning problems associated with this method are compounded in larger Braille displays. The larger Braille displays employing a large number of Braille cells require an even longer support rod. The increased length of the rod is often responsible for buckling during packaging and transportation, thereby requiring additional adjustment of the assembly.

In addition to the dimensional requirements of the Braille display assembly, it is also necessary to maintain the individual Braille cells in strict alignment to meet the sensitive tactile requirements of the user. If the Braille cells tactile pins are misaligned, the user may have difficulty reading the display. The support rod assembly, previously described as known in the art, does not provide precise alignment of the Braille cell tactile pins.

Prior art systems have been presented to provide a Braille display assembly which has and maintains precision cell positioning. Such Braille display assemblies include a holder capable of rigidly maintaining the individual cells in predetermined positions adjacent one another. While these prior art systems help to alleviate the problems associated with the dimensional specifications of the display, they do not provide a means for reliably aligning and maintaining the alignment of the Braille cell tactile pins.

Prior art Braille displays employ one individual tactile pin cap per individual Braille cell. The tactile pin cap serves to position and align the pins of the individual Braille cell and provides the cursor control buttons. The Braille cells and associated tactile pins caps are positioned adjacent to each other to establish the tactile surface. The use of individual cell caps for each Braille cell increases the manufacturing cost and the cost of materials. Braille readers are sensitive to the separation that is inherent with the use of individual Braille caps. This unevenness between each cell plagues all Braille displays known in the prior art. To tactile users, the tactility of the grooves and cell-to-cell unevenness is comparative to the noise or flicker on a computer monitor experienced by a visual user. As such, minimal spacing between the Braille cells is required to provide an acceptable tactile feel for the reader. Even with the closest fit possible with the prior art methods, the separation ridge between the Braille caps is identifiable to a Braille reader.

Additionally, maintenance and replacement of the individual tactile pins is often necessary. Contaminants that build up on the pins must be removed or the pins must be replaced upon excessive wear. With the prior art Braille display assemblies, removing an individual tactile pin cap for maintenance purposes requires that the securing stabilizers also be removed, thereby altering the alignment of all the individual caps which must then be realigned after the pins are replaced. A similar procedure must be followed to replace a defective Braille cell assembly.

Accordingly, there is a need in the art for an improved Braille display assembly. Improvements in manufacturability and repair are necessary in addition to enhancements in the tactile experience of the user. There is a need for an improved alignment mechanism and procedure for the individual Braille cells comprising the display that enhances the user interface and allows for easy maintenance of the tactile pins and individual Braille cells.

However, in view of the prior art considered as a whole at the time the present invention was made, it was not obvious to those of ordinary skill in this field that the identified improvements should be made nor would it have been obvious as to how to make the improvements if the need for such improvements had been perceived.

SUMMARY OF INVENTION

The longstanding but heretofore unfulfilled need for an improved Braille display assembly is now met by a new, useful, and non-obvious invention. The Braille display assembly in accordance with the present invention provides manufacturing cost reductions, improvements in reliability, and enhancements in the tactile experience for users.

The present invention provides a Braille display assembly including a plurality of individual Braille cells and a backplane adapted to receive the plurality of Braille cells, the backplane is selected to maintain each of the plurality of individual Braille cells in a predetermined position independent of the positioning of the other cells. The combination of the plurality of individual Braille cells and the backplane support allows for precise positioning of the cells and circuit communication between the cells. As such, the desired positioning is achieved and the individual cells are removable for repair and replacement without disturbing the alignment of the other cells.

In a particular embodiment, the backplane of the Braille display further includes a plurality of sockets mounted on a bottom side of the backplane in depending relation to the bottom side of the backplane and in spaced relation to one another wherein each socket is adapted to receive an individual Braille cell.

In an additional embodiment, the backplane further includes control circuitry to interface with the plurality of individual Braille cells. In an exemplary embodiment, the control circuitry is effective in receiving input from the cursor button or navigation button and communicating this input to the Braille cells as necessary.

In a particular embodiment, the backplane forms a top wall of a frame, and the Braille display further includes a bottom wall of the frame, an angle wall having a first part disposed in abutting relation to a leading edge of the backplane, the first part of the angle wall being coplanar with the backplane, a plurality of sets of tactile pin holes formed in the first part of the angle wall, each tactile pin being adapted to slideably receive a tactile pin, wherein the angle wall has a second part depending from a leading edge of the first part, the second part having a lower end disposed in abutting relation to a leading edge of the bottom wall of the frame. The bottom wall of the frame may be fabricated of an insulative material thereby eliminating the need to provide additional insulative means when connecting the display to a metal chassis.

To provide additional security in the frame, an upstanding flat wall is disposed in abutting relation to a second longitudinal edge of the frame bottom wall. A projection protruding from a trailing end of each of the plurality of Braille cells is provided and a plurality of slots are formed along the extent of the upstanding flat wall such that each slot of the plurality of slots adapted to receive the projection of an associated Braille cell. Additionally, a corresponding plurality of grooves are formed integral to the backplane, wherein each groove formed in the backplane is adapted to receive a leading end of a Braille cell along a top edge thereof, and each slot formed in the upstanding flat wall and each groove formed in the backplane cooperating with one another to stabilize each Braille cell of the plurality of Braille cells in the Braille display assembly.

Additional securing means are provided, wherein the frame bottom wall further includes a plurality of grooves formed in the frame bottom wall, each groove adapted to receive a leading end of a Braille cell along a bottom edge thereof, wherein each of the plurality of grooves and each slot formed in the upstanding flat wall and each groove formed in the backplane cooperate with one another to stabilize each Braille cell of the plurality of Braille cells in the Braille display assembly.

To prevent contaminants from reaching the circuitry of the system, the frame bottom wall further includes a plurality of deformable strip gaskets positioned perpendicular to the direction of the plurality of grooves. These deformable strip gaskets are effective in preventing the flow of liquid contaminants along the entire frame bottom wall. The strip gaskets may be fabricated of an absorbable material.

The plurality of Braille cells used in the Braille display include a plurality of piezoelectric reeds extending toward the angle wall in a stair step configuration. The Braille display also includes a plurality of tactile pins, each of the plurality of tactile pins associated with each of the plurality of piezoelectric reeds such that the bending of the piezoelectric reed moves the associated tactile pin in the vertical direction through the associated tactile pin hole. The tactile pins may be formed independently of one another or they may be formed in connected relation to one another forming a set of tactile pins so that one set of tactile pins is adapted to be associated with one Braille cell. The present invention is adaptable to be used with a variety of Braille cell assembly configurations having piezoelectric reeds for actuating tactile pins in the vertical direction.

To control the position of the cursor and to navigate within the Braille line display, the Braille display further includes a plurality of cursor routing buttons, each of the plurality of cursor routing buttons associated with each of the plurality of Braille cells, and a plurality of navigation buttons, each of the plurality of navigation buttons associated with each of the plurality of Braille cells. The plurality of cursor routing buttons and navigation buttons in circuit communication with the backplane.

In accordance with another embodiment, a monolithic cap is provided and adapted for use in a tactile display assembly. The monolithic cap includes a housing adapted to enclose multiple tactile cell assemblies. The housing includes a plurality of individual tactile cell apertures, where each of the plurality of tactile cell apertures is adapted to receive a single tactile cell pin. With the present invention the tactile pin is captive in the mechanical design, being secured between the top frame and the monolithic cell cap using a negative stop and a positive stop on the tactile pin. As such, there is no dependency on the bimorph actuators to hold the tactile pins in place.

In accordance with a preferred embodiment, the Braille display includes a cell cap providing a common tactile surface for the plurality of Braille cells, cell cap being releasably engaged to the backplane. The cell cap of the present invention includes a plurality of tactile pin holes formed in the cell cap, each tactile pin hole being adapted to slideably receive a tactile pin, and a plurality of button access holes, each button access hole being adapted to receive one of a plurality of control buttons, such as the cursor routing button or the navigation button. The control buttons may be releasably engaged to the underside of the cell cap. As such, the novel cell cap provides self-alignment of the tactile pins of the individual Braille cells and eliminates the ridge separation between cells as is inherent in the prior art displays.

A plurality of Braille display assemblies as described may be combined to provide a multiple line display. Accordingly, the Braille display assembly further includes a socket secured to an edge of the backplane and a connector secured to an opposite edge of the backplane. As such, a first Braille display assembly and the socket of a first Braille display assembly is adapted to receive a connector of a second Braille display assembly, such that a plurality of individual Braille display assemblies are secured in circuit communication to provide a multiple line display.

To prevent contaminants from entering the interior of the Braille display, the present invention includes an end cap secured to either a socket or a connector of the backplane. Additionally, the end cap may include means through which to identify the Braille display assembly as being the last display element in a multiple line display. Each of the Braille displays in a multiple line display includes a socket and a connector to establish circuit communication between each individual backplane. As such, a display having 40 individual Braille cells may be constructed of two 20 Braille cell displays utilizing the sockets, connectors and end caps of the present invention.

The Braille display assembly in accordance with the present invention provides manufacturing cost reductions, improvements in reliability, and enhancements in the tactile experience for users. The Braille display assembly provides improvements is manufacturing while still maintaining the modularity at the Braille cell level. The novel Braille display assembly in accordance with the present invention eliminates the need for additional securing rods and associated plastic, thereby reducing the overall weight of the device. The novel self-aligning system provided by the present invention allows the tactile pins and the Braille cells to be easily maintained. The novel monolithic cell cap can be easily remove to provide access to all the individual tactile pins and buttons simultaneously. Additionally, an individual Braille cell can be removed from the Braille display and replaced or repaired without disturbing the alignment of the remaining Braille cells.

As such, the present invention provides improvements in manufacturability and maintenance of Braille display assemblies. Tactile pin maintenance and bimorph reed replacement are greatly simplified utilizing the novel frame of the present invention. Additionally, the present invention provides a tactile pin cap for multiple Braille cell assemblies, thereby eliminating the separation between each cell that is detectable by a user and considered undesirable. The user is presented with a smooth tactile surface presenting protuberants only for the tactile pins and the cursor positioning buttons as desired. The tactile cell assemblies in combination with the bused frame and the novel tactile pin cap for multiple cells enables self-alignment of the cells, thereby eliminating the additional alignment and securing requirements of the prior art.

Other features and advantages of the invention will become apparent or be described in connection with the following detailed description of the preferred embodiments of the present invention.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1A:
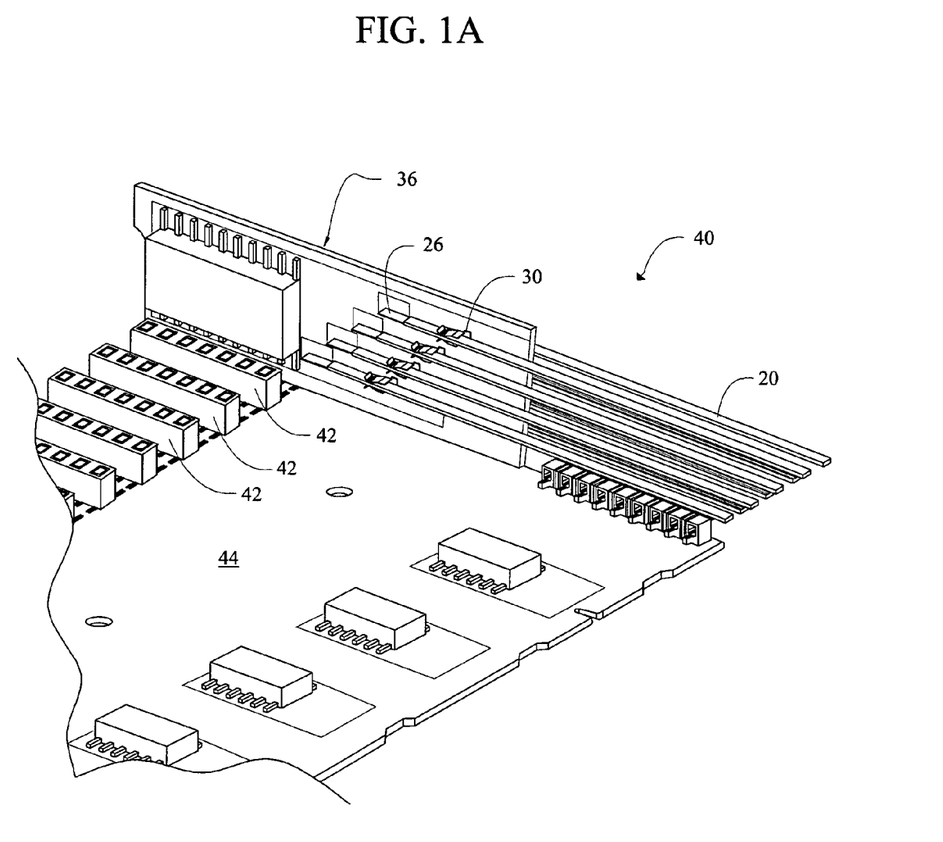
FIG. 1A is a perspective view depicting the interconnection between a Braille cell assembly and a frame.
Figure 1B:
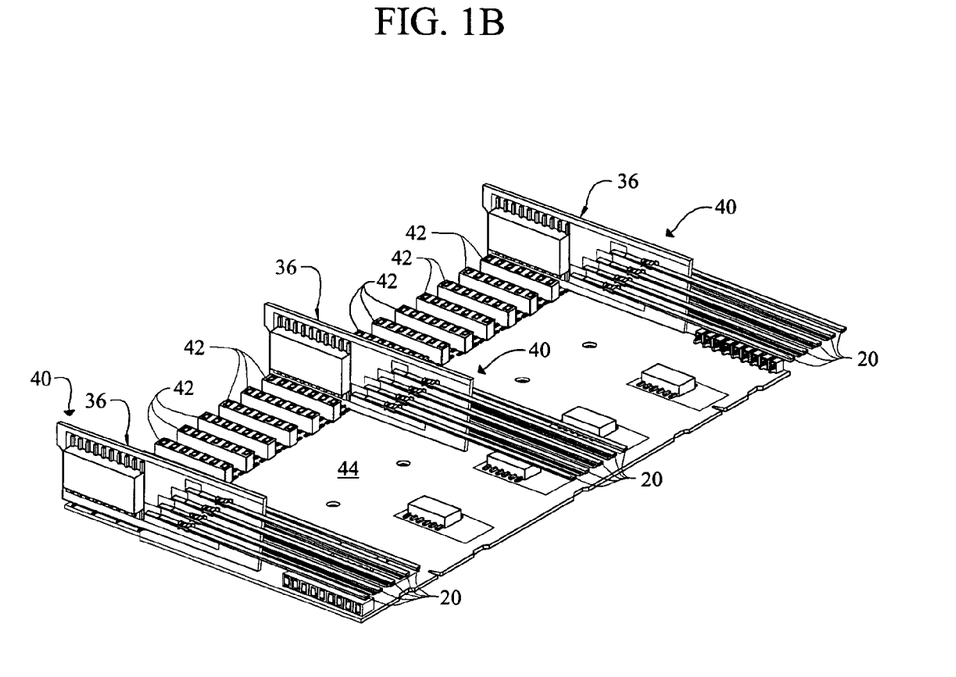
FIG. 1B is a perspective view like that of FIG. 1A, further depicting three Braille cell assemblies secured to the frame.

FIG. 1A depicts a Braille cell assembly 40 mounted on backplane 44 and FIG. 1B depicts a plurality of said Braille cell assemblies mounted on said backplane. Braille cell assembly 40 includes printed circuit board 36 to which a plurality of piezoelectric element reeds are secured. A plurality of printed circuit board-receiving sockets 42 are mounted on backplane 44 in spaced relation to one another as depicted. A large number of Braille cell assemblies 40 may therefore be mounted to said backplane as suggested by FIG. 1B. The present illustration shows the piezoelectric element reeds secured to the printed circuit board utilizing clip 30, however this is not meant to be limiting and other Braille cell assemblies having a variety of configurations are within the scope of the invention.

In addition to providing independent support for the individual Braille cells, the backplane of the present invention also provides means for busing multiple backplanes together, thereby providing a multiple line Braille display. As shown with reference to FIG. 4B, the backplane includes a connector 17 at one edge and a socket at the opposite edge 15. The socket and connector combination provides an interconnect within the backplane to allow multiple Braille display assemblies to be bused together. With this novel interconnect configuration, the number of Braille cells used in this modularized design could consist of any multiple. In a particular embodiment, the level of modularization was carefully selected to match a minimum size display of twenty cells. By designing each module to interconnect through busing of the backplanes, modules can be cascaded to create a twenty, forty, sixty or eighty cell Braille display. Additional sizes are also within the scope of the invention, including a four cell and twenty cell module interconnected to provide a forty-four, seventy-two, or eighty-four cell Braille display. Additional logic circuitry is provided on the backplane to control the cursor and navigation buttons without relying on hardwiring from the Braille cell PCB to a cell cap.

Figure 2A:
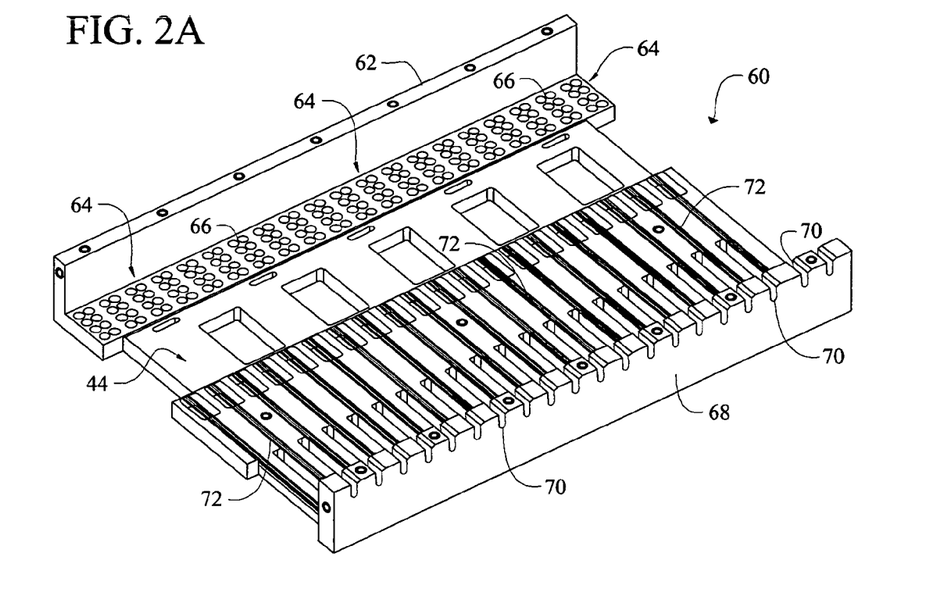
FIG. 2A is a top perspective view of the frame of the novel Braille display assembly.
Figure 2B:
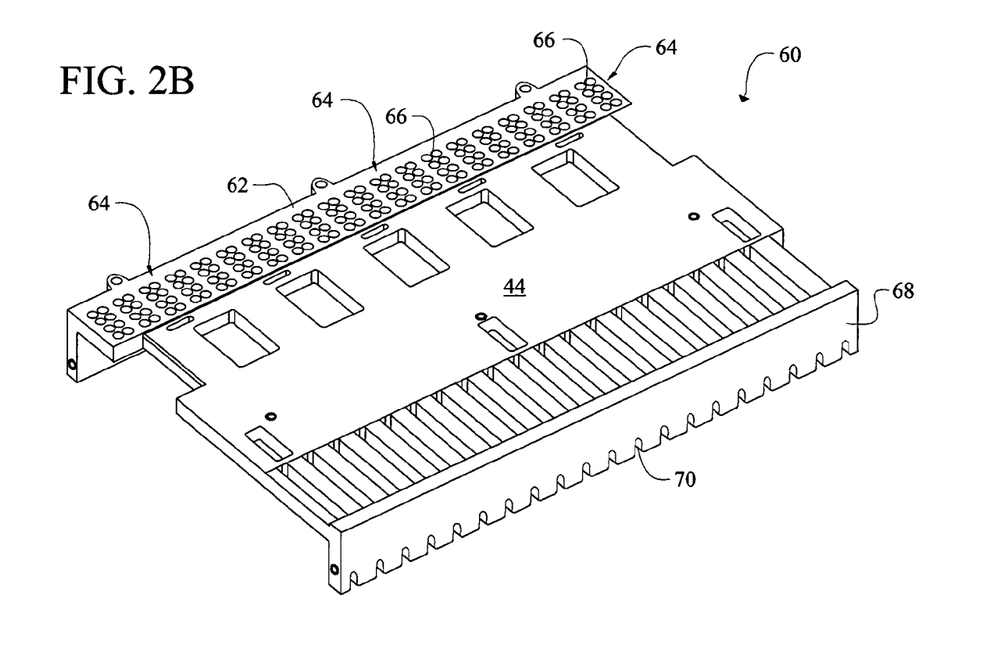
FIG. 2B is a bottom perspective view of the frame of the novel Braille display assembly.

FIG. 2A is a top perspective view of frame 60 and FIG. 2B is a bottom perspective view thereof. Frame 60 includes backplane 44 (see FIGS. 4A and 4B) and bottom wall 46. It also includes an angle wall 62 having a plurality of sets 64 of pinholes or bores 66 formed in a horizontal part thereof. The horizontal part of angle wall 62 abuts a leading edge of backplane 44 and is coplanar therewith. Each pinhole or bore 66 is adapted to slideably receive a pin, not depicted in FIGS. 7A and 7B. The embodiment illustrated is for a Braille display having twenty individual Braille cell assemblies. As such, there are eight (8) pinholes or bores 66 per set 64 of pinholes or bores.

As shown in FIGS. 2A and 2B, upstanding flat wall 68 abuts a trailing edge of top wall 44 and a trailing edge of bottom wall 46. A plurality of slots 70 are formed in the lower edge of said flat wall 68. Each slot engages a projection formed in the trailing end of its associated Braille cell assembly. A corresponding plurality of slots 72 is formed in backplane 44 to accommodate the respective leading ends of the Braille cells. Each set of slots 70 and 72 cooperate with one another to provide a mount for each Braille cell 36.

Figure 3:
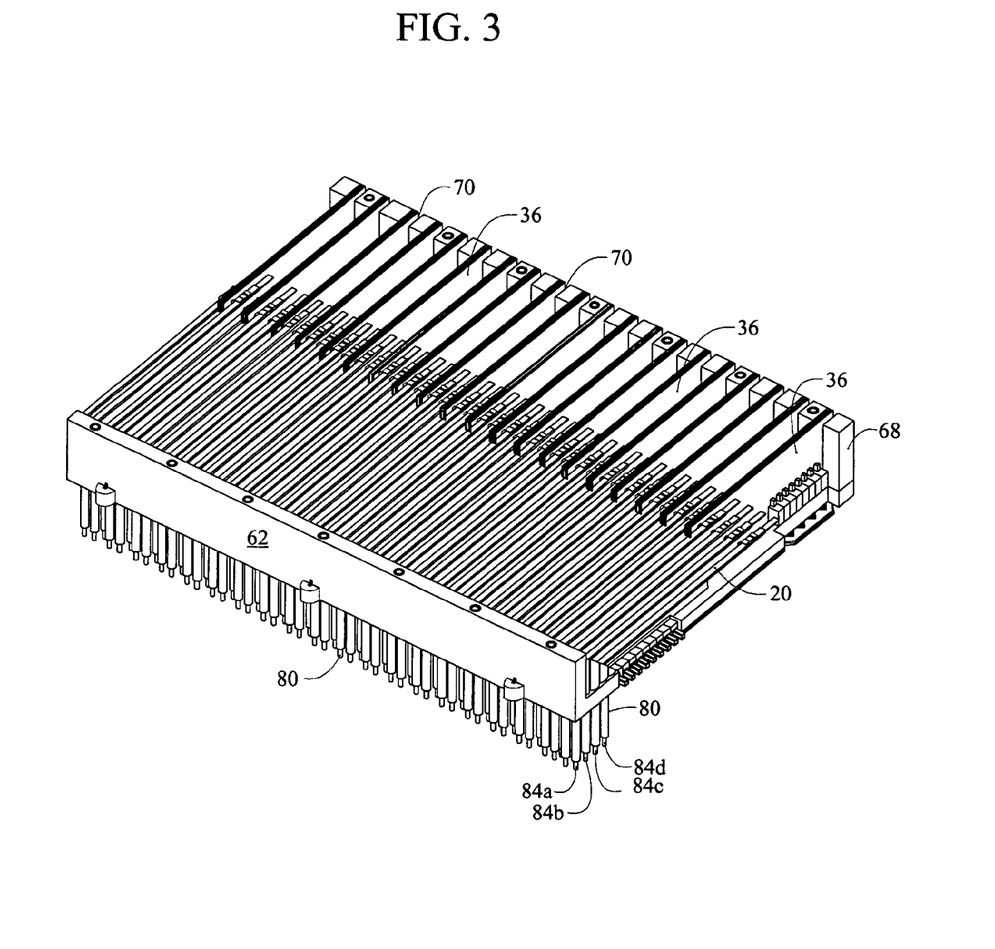
FIG. 3 is a perspective view depicting the interconnection between the Braille cell and the frame top.

FIG. 3 depicts frame 60 when a Braille cell 36 is mounted in each slot 70. It also depicts a Braille tactile pin 80 disposed in each tactile pin hole or bore 66. One (1) bimorph reed 20 is associated with each tactile pin 80, there being one Braille cell 36 having eight (8) bimorph reeds mounted thereto associated with each set 64 of eight (8) pin holes or bores 66 as aforesaid. The tactile pins 80 are provided in four differing lengths, 84a, 84b, 84c and 84d as indicated in FIG. 3. The pins may be manufactured individually, or they may be manufactured in connected-together groups of eight (8) that are separated from one another after assembly into the Braille cell, thereby improving manufacturability. As shown in this embodiment, the pins 80 are not contained in an individual cell cap for each individual Braille cell as is known in the prior art.

Figure 4A:
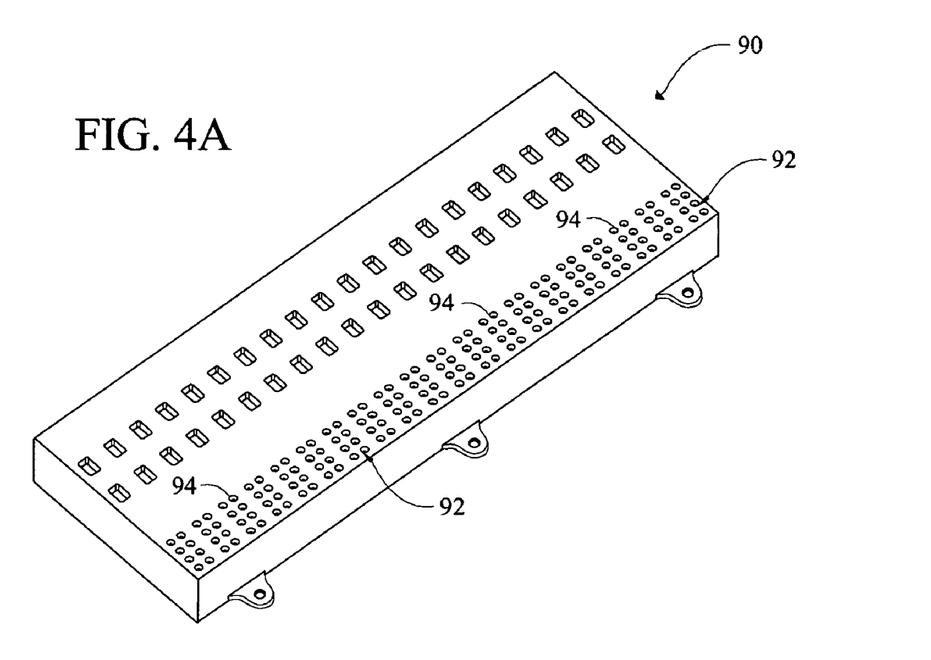
FIG. 4A is a top perspective view of the novel cell cap.
Figure 4B:
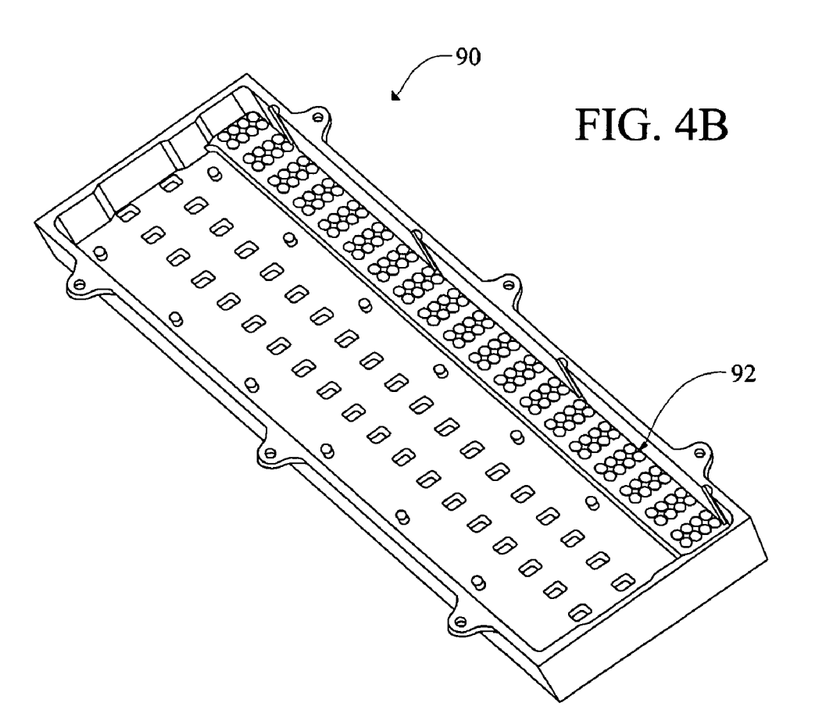
FIG. 4B is a bottom perspective view of the novel cell cap.

The novel monolithic cell cap of the present invention is depicted in FIGS. 4A and 4B and is denoted as a whole by the reference numeral 90. Twenty (20) sets 92 of tactile pin holes 94 are depicted, each tactile pin hole being adapted to slidingly receive the tip of tactile pin 80. This configuration is referred to as a "double decade." Unlike the aforementioned prior art Braille cells that require one individual cap per set of pinholes, cell cap 90 is a monolithic cap for all sets of tactile pin holes, i.e., cell cap 90 enables one cap to cap a plurality of Braille cells. With the present invention the tactile pin 80 is captive in the mechanical design, being secured between the top frame 60 and the monolithic cell cap 90 using a negative stop and a positive stop on the tactile pin. As such, there is no dependency on the bimorph actuators to hold the tactile pins in place. This low cost portion of the display, including the top frame, cell cap and pins, eliminates the requirement to clean bio-contaminants on a regular basis. This portion may be considered disposable. Additionally, an individual Braille cell can be repaired or replace as needed, without disrupting the tactile pins. Cell cap 90 significantly reduces the tolerance issues associated with individual caps without compromising access to the individual Braille cells if repair or replacement is required.

Figure 6:
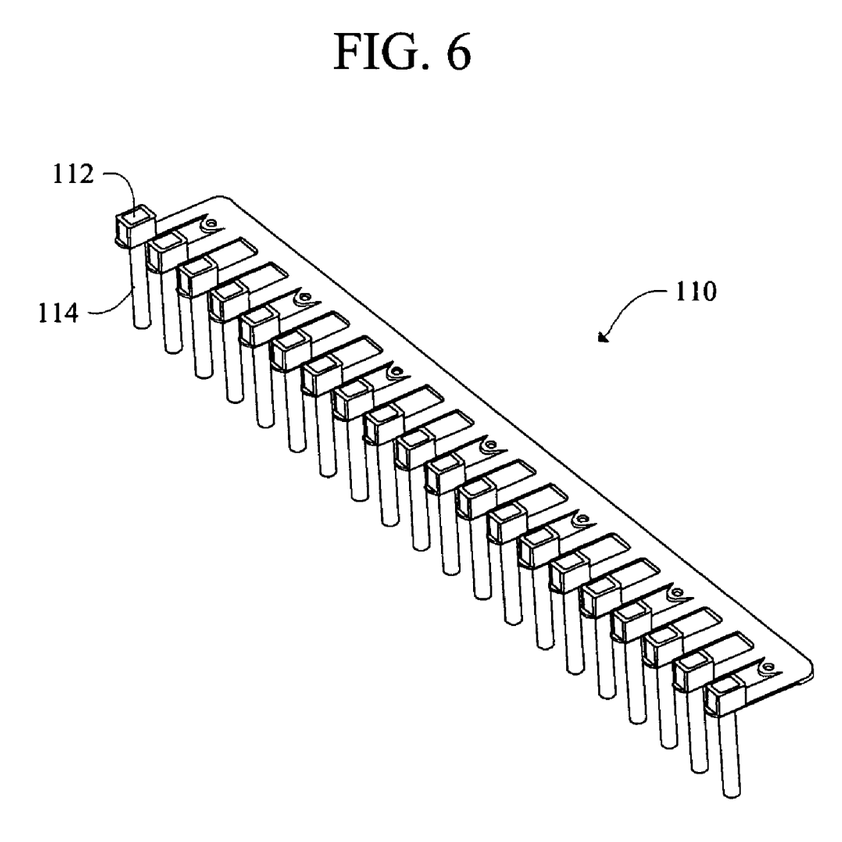
FIG. 6 is a perspective view of a novel set of buttons.

Additionally the novel monolithic cell cap includes openings for the cursor and navigation buttons. The buttons are shown in greater detail with reference to FIG. 6. FIG. 6 illustrates a set of buttons and a frame 110 for holding the buttons. The buttons exist over a tact switch as shown. Each button has a head 112 that is enlarged with respect to its stem 114. Frame 110 has a comb-like construction where the contiguous teeth of the comb are spaced apart from one another by a space that slideably receives a stem 114. The teeth of the comb thus support heads 112. Buttons 110 perform functions relating to cursor location and panning features. The design and functionality of the buttons are known in the art where the button is positioned within the individual cell cap of the Braille cell assembly. However, utilizing the novel cell cap in accordance with the present invention, the set of buttons are secured to the underside of the cap further enhancing the manufacturability and maintenance of the assembly. Additionally, the design of the present invention allows for as plurality of buttons to be manufactured as a single piece having interconnects between the buttons. Manufacturing efficiencies are realized with this design, allowing for a row of buttons to be inserted concurrently and then individually separated.

In an additional embodiment, the monolithic cell cap may be constructed with anti-bacterial plastics or a variety of other materials designed to prevent the spread and growth of germs.

Figure 5:
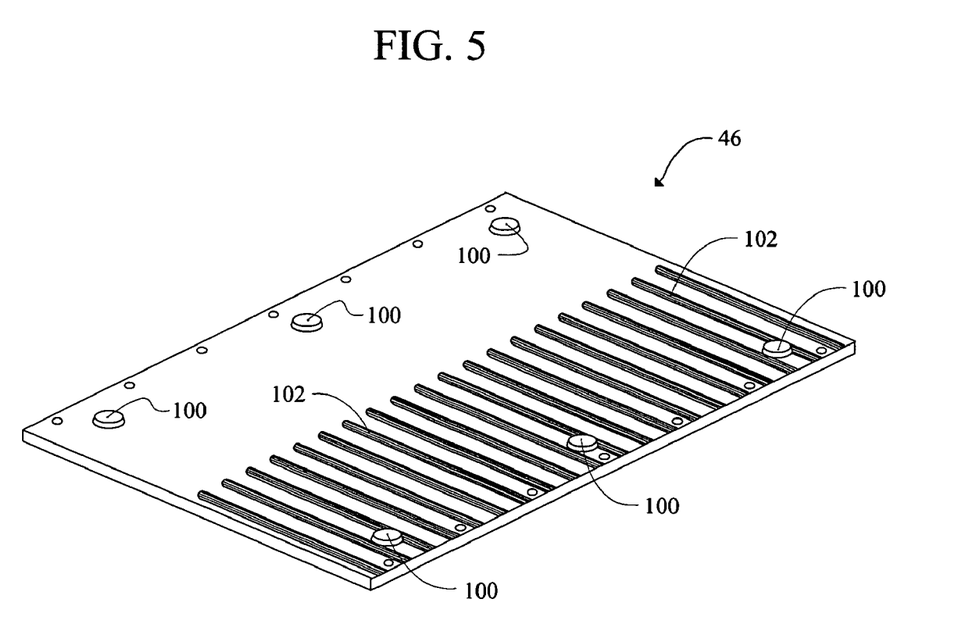
FIG. 5 is a perspective view of the frame bottom.

Frame bottom wall 46 is more fully depicted in FIG. 5. Six (6) machine threaded inserts collectively denoted 100, are employed to attach the double decade assembly to the final OEM product. Other means of attaching the frame are within the scope of the invention. Frame bottom wall 46 is preferably constructed of a material that does not require additional isolation from the metal chassis to which it is mounted. Slots 102 cooperate with slots 72 formed in backplane, or top wall, 44 to hold the Braille cells 36.

Figure 7:
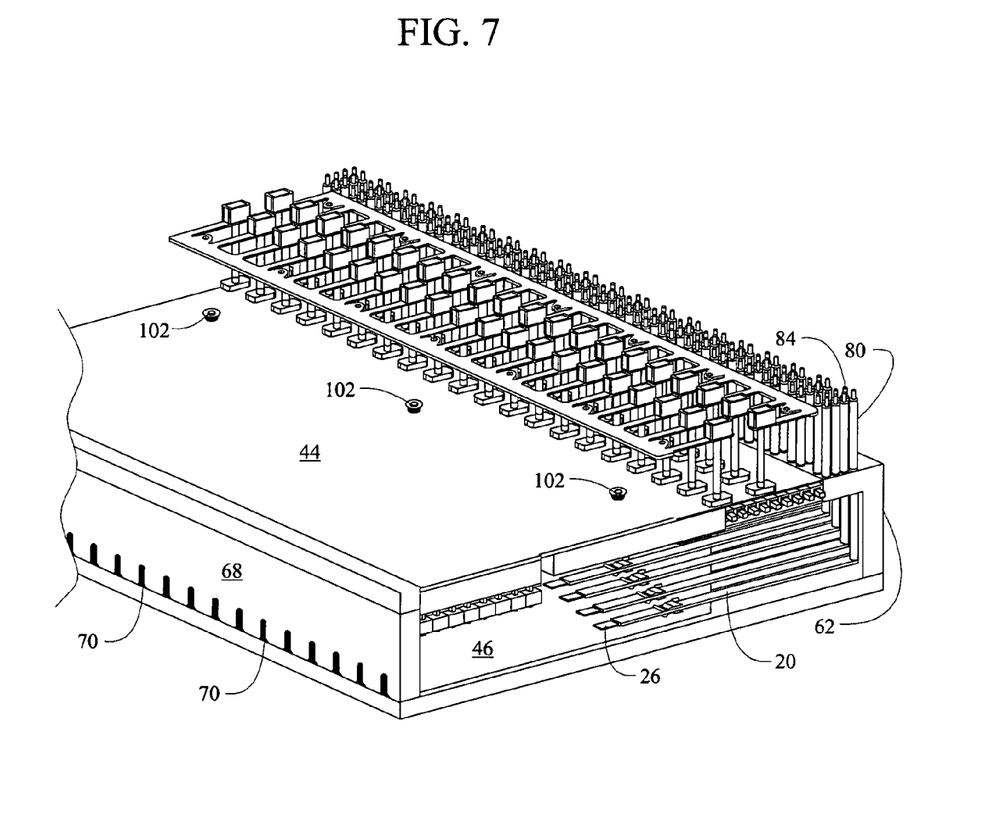
FIG. 7 is a perspective view of the novel double decade Braille display assembly absent the cell cap.
Figure 8:
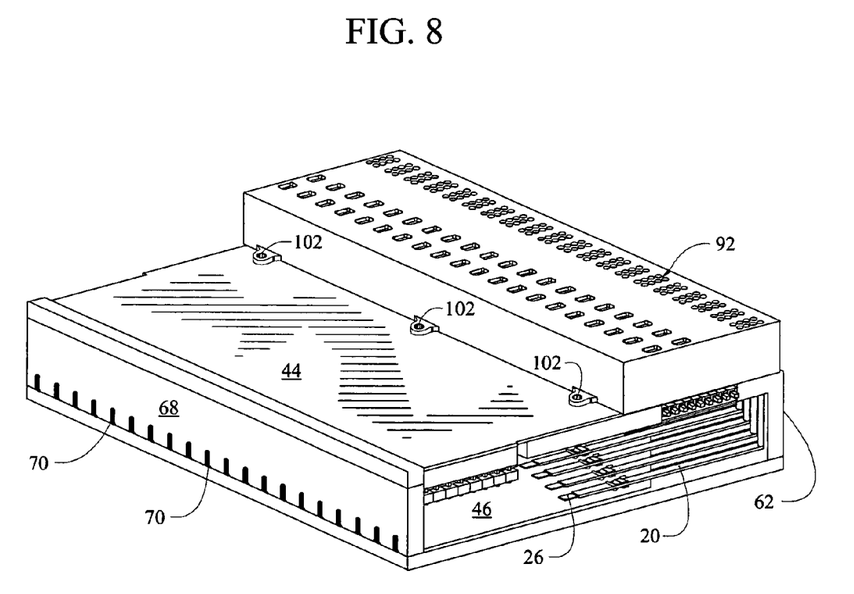
FIG. 8 is a perspective view of the novel double decade Braille display assembly with the cell cap.

FIG. 7 depicts the novel double decade Braille cell assembly without the novel cell cap. Note that there are two (2) button and frame assemblies 110 of the type depicted in FIG. 11 and that said assemblies 110 are disposed in confronting relation to one another. FIG. 8 depicts the double decade Braille cell assembly with the novel cell cap 92 in its functional position. All pins are in their retracted position in this figure.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A Braille display assembly, comprising:
   a frame including a top wall, a bottom wall, and an angle wall, wherein the angle wall includes a plurality of sets of tactile pinholes;
   a plurality of individual Braille cells supported by the frame, and
   a cell cap including a plurality of sets of tactile pinholes, the cell cap being secured to the frame, whereby the pinholes of the frame and the pinholes of the cell cap are in alignment and are adapted to receive a plurality of tactile pins;
   whereby the cell cap encases the plurality of individual Braille cells providing a common tactile surface for the plurality of Braille cells.

2. The Braille display of claim 1 wherein the cell cap is adapted to provide a positive stop for the tactile pins.

3. The Braille display assembly of claim 1, wherein the cell cap further comprises a plurality of button access holes, each button access hole being adapted to receive one of a plurality of control buttons.

4. A Braille display, comprising:
   a cell cap providing a common tactile surface for a plurality of Braille cells;
   the cell cap being releasably engaged to the Braille display such that the cell cap encases the plurality of Braille cells;
   a plurality of sets of tactile pinholes formed in the cell cap, each tactile pinhole being adapted to slideably receive a tactile pin;
   a frame comprising a top wall, a bottom wall, and an angle wall wherein the angle wall has a first part disposed in abutting relation to a leading edge of the top wall, the angle wall further comprising a plurality of sets of tactile pinholes formed in the first part of the angle wall; and
   wherein each of the plurality of tactile pinholes formed in the cell cap are positioned to be aligned with each of the plurality of tactile pinholes formed in the first part of the angle wall;
   a plurality of individual tactile pins being slideably received within the pinholes of the angled wall and the cell cap.

5. The Braille display of claim 4, wherein a plurality of control buttons are releasably engaged to the underside of the cell cap.

6. The Braille display of claim 5, wherein the bottom wall of the frame is fabricated of an insulative material.

* * * * *